US000001413H

United States Statutory Invention Registration [19]

[11] Reg. Number: H1413

Gunn

[43] Published: Feb. 7, 1995

[54] ESCAPE METHODS FOR MODEM COMMUNICATIONS

[76] Inventor: Timothy D. Gunn, 8120 Red Oak Ct., Mounds View, Minn. 55432

[21] Appl. No.: 1,855

[22] Filed: Jan. 8, 1993

[51] Int. Cl.[6] ..... H04B 1/38; H04L 5/16

[52] U.S. Cl. ..... 375/8; 395/200

[58] Field of Search ..... 375/8, 9; 455/73; 395/200, 250

[56] References Cited

U.S. PATENT DOCUMENTS

| | | | |
|---|---|---|---|
| 4,440,988 | 4/1984 | Heatherington | 375/9 X |
| 4,852,045 | 7/1989 | Kraul et al. | 364/900 |
| 4,926,448 | 5/1990 | Kraul et al. | 375/121 |
| 5,212,774 | 5/1993 | Grider et al. | 395/200 |

*Primary Examiner*—Bernarr E. Gregory

[57] ABSTRACT

Two Escape Methods for modem control are described, both of which are a form of TIES (Time Independent Escape Sequence). Since TIES is more descriptive of the methodology being used, as opposed to a specific protocol or standard, the present specification describes the protocol used in +++AT<CR> escape sequence (in-band escape) and <BREAK>AT<CR> escape sequence (out-of-band escape).

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ESCAPE METHODS FOR MODEM COMMUNICATIONS

FIELD OF THE INVENTION

The present invention relates to modem communication systems and in particular to escape methods used for changing the mode of operation of a modem.

BACKGROUND OF THE INVENTION

Modem communication is a widely used for of communications between computers over telephone lines. A local modem is typically connected to a personal computer through a serial interface and the local modem is connected to the telephone line. At a remote location, a remote modem is connected in a similar fashion between the remote end of the telephone line and the remote personal computer.

Modems typically operate in two modes of operation: ON-LINE mode and COMMAND mode. The method often used to switch between modes of operation is the escape sequence. Escape methods primarily exist so that upon completion of a call a modem can be hung up. The process of hanging up a modem can be accomplished in many ways' one of which is to drop the DTR signal, another way is to "escape" or change the modem from ON-LINE mode into COMMAND mode, so that a hang up command can be sent to the modem. Prior art use of escape methods are manifold and are described in the following patents and documents, which are hereby incorporated by reference:

| U.S. Pat. No. | Inventors | Issued |
|---|---|---|
| 2,347,831 | Kinkead | May 2, 1944 |
| 2,430,447 | Branson et al. | November 11, 1947 |
| 2,543,174 | Keyes et al. | February 27, 1951 |
| 2,587,483 | Keyes et al. | February 26, 1952 |
| 2,735,885 | Keyes et al. | February 21, 1956 |
| 2,871,286 | Bacon et al. | January 27, 1959 |
| 2,948,777 | Andrews et al. | August 9, 1960 |
| 3,304,372 | Filipowsky | February 14, 1967 |
| 4,208,545 | Zener | June 17, 1980 |
| 4,549,302 | Heatherington | October 22, 1985 |

Publications

CCITT X.28 Provisional Recommendation, 1977, published by the CCITT.

DCS Autodin Interface and Control Criteria, October 1970, published by Defense Communication Agency.

Digital Telemetering Receiver-Control Manual No. 10902, 1962, published by Leeds & Northrup.

Digital Telemetering Receiver-Control Manual No. 10903, 1962, published by Leeds & Northrup.

TRA5 & TRD5 MWH Interchange Receivers Instruction Manual, 1973, published by Multi-Tech Systems.

Megawatt and Megawatt-Hour Receiver Interface Specifications, by Craig D. Helverson, Jan. 25, 1972, published by Northern States Power Company and available through Multi-Tech Systems, Inc.

SUMMARY OF THE INVENTION

The present disclosure describes two Escape Methods, both of which are a form of TIES (Time Independent Escape Sequence). Since TIES is more descriptive of the methodology being used, as opposed to a specific protocol or standard, the present specification describes the protocol used in +++AT<CR> escape sequence (in-band escape) and <BREAK>AT<CR> escape sequence (out-of-band escape).

DESCRIPTION OF THE DRAWINGS

In the drawings, where like numerals describe like components throughout the several views.

DETAILED DESCRIPTION OF THE PREFERRED EMBODIMENTS

Figure 1:
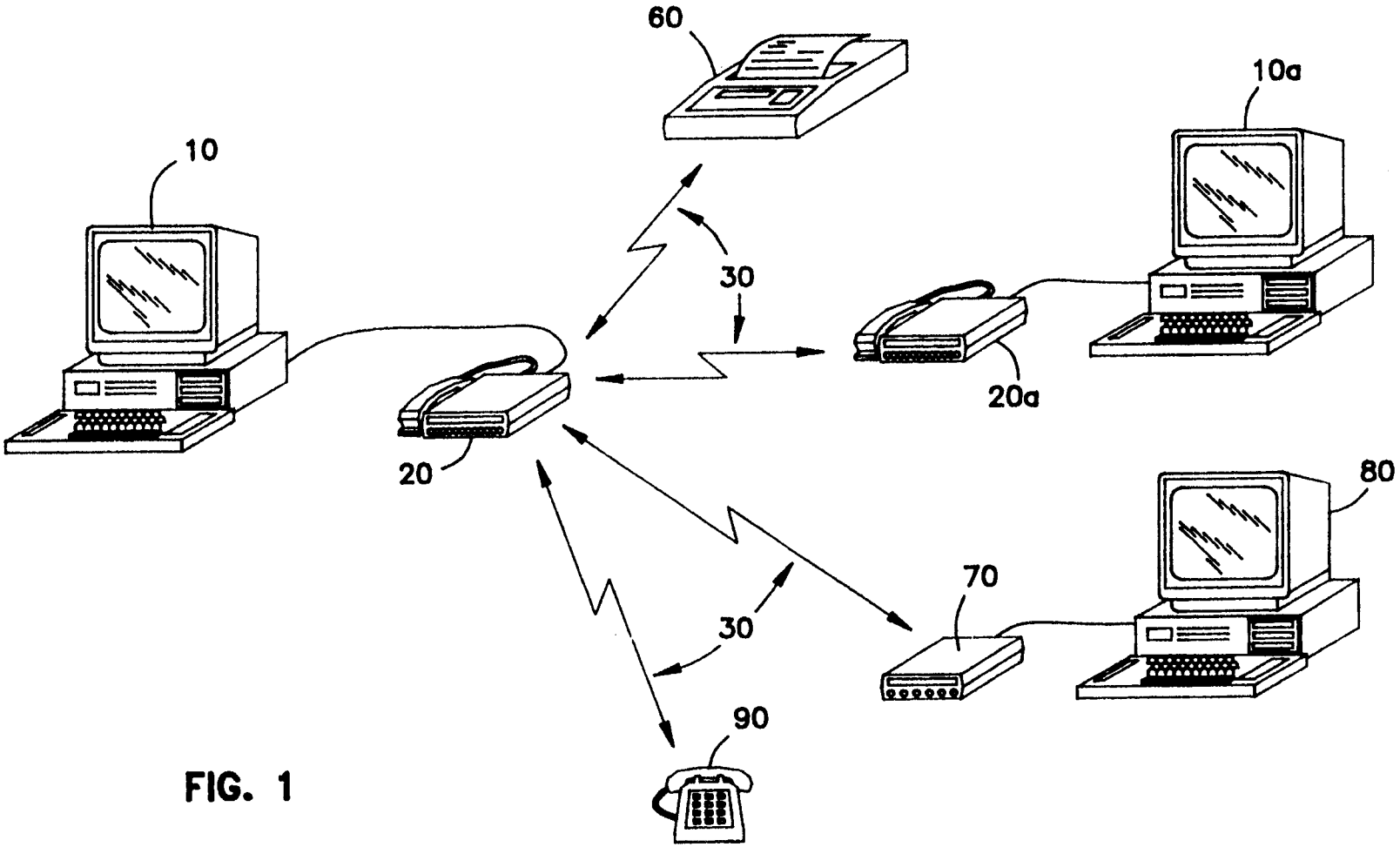
FIG. 1 shows the telecommunications environment within which the present may operate in several of the possible modes of communication.

In the following detailed description of the preferred embodiment, reference is made to the accompanying drawing which forms a part hereof.

FIG. 1 shows a typical arrangement for the use of the present system. The modems 20, 20*a* and 70 utilize two Escape Methods, both of which are a form of TIES (Time Independent Escape Sequence). Since TIES is more descriptive of the methodology being used, as opposed to a specific protocol or standard, this document specification describes the protocol used in both Escape Methods. These Escape Methods are:

+++AT<CR> escape sequence (in-band escape) Method 1

<BREAK>AT<CR> escape sequence (out-of-band escape) Method 2

Before describing both of these Escape Methods and their modifiable operating parameters, an explanation of the following questions may be helpful. What are a modem's two modes of operation? What is escape? When and how is escape used?

A modem has two modes of operation: COMMAND and ON-LINE. When in COMMAND mode, the modem accepts AT commands setting or modifying modem operating parameters. When a modem is ON-LINE, it means that the modem has connected to another modem, a carrier is established and the modems are ready to send and receive data. Once the modem has gone ON-LINE, it no longer directly accepts AT commands, regardless of whether they are issued from a keyboard or in a data file. Sometimes it is necessary to be able to issue AT commands to the modem while ON-LINE. This is accomplished by issuing an "Escape Sequence" to the modem changing it into COMMAND mode, which allows it to accept AT commands without dropping the connection. This escape to COMMAND mode can result from either one of the Escape Methods being used. One is an escape with a wait for a command to return to ON-LINE mode. The other is a temporary escape with an automatic return to ON-LINE mode (escape long enough to execute a command or commands), which is referred to as a fully transparent escape.

An Escape Sequence must contain a sequence or pattern recognized by the modem (i.e., which are defined by the modem's Escape Method(s)) causing it to "escape" (change) from ON-LINE mode to COMMAND mode. As mentioned previously, the present invention uses two Escape Methods, both of which are a form of Time Independent Escape Sequence or "TIES" method.

The first escape method uses +++AT<CR> as the escape sequence and is referred to as an in-band escape sequence. An in-band escape sequence is a pattern that is sent to the modem as a part of the data stream, therefore in the data band. This sequence can be issued either by typing the characters on a keyboard or by entering it into a data file. A complete description of the +++AT<CR> escape method's implementation and operation is provided in Section 1, below.

The second escape method uses <BREAK>AT<CR> as the escape sequence and is referred to as an out-of-band escape sequence. An out-of-band escape sequence is a pattern that cannot and does not occur in the data stream and is therefore out of the data band. It is either the result of pressing the "break" key on a keyboard followed by A, T, an optional sequence of commands and a carriage return, or as a special control character defined as "break" followed by A, T, an optional sequence of commands and a carriage return. A complete description of the <BREAK>AT<CR> escape method implementation and operation is provided in Section 2, below.

The AT commands used to select the modem's Escape Method are:

%E0=ESCAPE DISABLED

%E1=+++AT method (default)

%E2=<BREAK>AT method

%E3=BOTH methods enabled

The register (also known as the S-register) that stores these values is called S31, which is explained below:

S31

Defined: S31 is primarily used for special cases when a software package requires an "OK" response to "+++" before it will continue. In these special cases setting S31=5 will result in an "OK" response, any time "+++" is received by the modem. See Table 1 for the bit settings for register S31.

Operation: S31 is the bit map of %E commands that selects the Escape Method and the "OK" response to "+++".

TABLE 1

S31 Register Bit Settings

| S31 Value | S31 Result | Bit Settings |
|---|---|---|
| S31 = 0 | disables escape | S31 all bits = 0 |
| S31 = 1 | +++AT method active | S31 bit 0 = 1 |
| S31 = 2 | <BREAK>AT method active | S31 bit 1 = 1 |
| S31 = 3 | both escape methods active | S31 bits 0 and 1 = 1 |
| S31 = 5 | "OK" response to "+++" active | S31 bits 2 and 1 = 1 |
| S31 = 7 | both active and "OK" to "+++" | S31 bits 2, 1, and 0 = 1 |

Section 1: Escape Method 1 +++AT<CR> Escape Sequence

The "+++AT<CR>" sequence replaces the "pause +++ pause" sequence and existing software supporting "+++" as an escape method to hang up a modem should have no problem with it. When software issues a "+++AT<CR>" to the modem, the modem switches from on line mode to command mode. The most software after issuing the "+++AT<CR>" does a blind wait for the modem to enter command mode, after which it sends an "ATH<CR>" to hang up the modem.

In operation, if a user is ON-LINE and wants to set S0 register to answer on the first ring. The following sequence of events occurs enabling the modem to escape to COMMAND mode, send the command to set S0 and then return back to ON-LINE mode.

1. The "+++AT" signal is sent to the modem.
2. The modem buffers "+++AT" and starts "the wait for CR timer" register S32.
3. The modem passes the "+++" through to the other side, just as it always has.
4. Upon receiving the "<CR>" the modem escapes to command mode.
5. "ATS0=1<CR>" is sent to the modem.
6. The modem buffers "ATS0=1<CR>" and identifies it as a valid command.
7. The modem executes the command, setting S0=1
8. "ATO<CR>" is sent to the modem.
9. The modem returns to ON-LINE mode.

Some software waits for the modem to respond "OK" to a "+++AT<CR>", if an application has this requirement, setting the S31 register equal to one (ATS31=1), will cause the modem to respond "OK" to the "+++AT<CR>" escape sequence. The character "+" is a defacto industry standard; a different character can be selected using the modems S2 register. The use of "<CR>" as the activation character is also a defacto industry standard; a different character can be selected using the modems S3 register. The prior art modem manuals for many industry modems contain a listing of the character code values and entry procedures for registers S2 and S3. For the remainder of this section the "+" and "<CR>" will be used, with the understanding that they could be changed to other characters such as "@" and "$".

What does the modem, using "+++AT" escape sequence, do upon receiving a "+++"? Any time an "AT" immediately follows a "+++", the "AT" is buffered, the modem waits for a carriage return, and the "AT" command is not sent to the other side—(like it always has). How long does the modem buffer the "AT" and wait for a <CR>? The "AT" buffering is controlled by two parameters, either of which can validate receipt of an escape sequence. The first parameter (S32) is Wait for <CR> time or BREAK passthru, which sets an interval for "AT . . . <CR>" to be received. The wait for <CR> time is used in the event that a "+++AT" occurs without being followed by a <CR>. If the Wait for <CR> time elapses, then the modem will clear the command buffer, send the "+++AT" and any characters to the other side and abort the escape. The second parameter (S34) sets the maximum number characters that can be buffered following an "AT", before a <CR> must be received. If the maximum number of characters is exceeded without receiving a <CR>, then the modem will clear the "AT" from the command buffer and abort the escape. For a detailed explanation of these parameters, see the description of the operation of S-registers 32 and 34 below.

S-Registers that modify the +++AT<CR> escape sequence are defined as follows:

S32 is defined as follows. A wait for <CR> time or BREAK passthru interval is started after the "A" in "+++AT" is received. The duration of the wait for <CR> time is controlled by the value of S32, in increments of 100 ms. If the time interval expires before the "AT . . . <CR>" is received, the escape sequence is aborted, the command buffer is cleared, and the "AT" is passed through to the other side.

In operation, if the wait for <CR> time or BREAK passthru interval elapses without a "+++AT" being followed by a <CR>, then the modem will clear the "AT" from the command buffer, pass the "AT" to the other side and abort the escape. Or, if an "AT . . . <CR>" occurs within the interval, the modem will escape to COMMAND mode, execute the command, respond "OK", and remain in COMMAND mode. Upon entering COMMAND mode, the S34 maximum number of characters (that can be buffered value) and the S32 wait for <CR> timer are no longer valid. The modem reverts to its regular command buffer length, which in the present case is 60. The modem can be returned to ON-LINE mode using the standard command "ATO<CR>". The default S32 value is 20, which equals 2 seconds.

S34 is defined as follows. The maximum number of characters that can be buffered following an "AT", before a <CR> must be received. The maximum number of characters is determined by the value of S34. This is used to control the chances of successful escape and in the event that a "+++AT . . . " is in a file, it speeds up clearing the command buffer, and passing the "AT . . . " to the other side.

In operation, if the number of characters after "AT" exceeds the S34 value, then the command buffer is cleared, the data "+++AT . . . " is passed to the other side and the escape sequence is aborted. Or, if "AT" followed by a <CR> or a command and a <CR> occurs, the modem will escape to COMMAND mode, execute the command, respond "OK", and remain in COMMAND mode. Upon entering COMMAND mode, the S34 value and the S32 time are no longer valid. The modem reverts to its regular command buffer length, which in the present case is 60. The modem can be returned to ON-LINE mode using the standard command "ATO<CR>". The default value for S34 is 10.

Section 2: Escape Method 2 <BREAK>AT<CR> Escape Sequence.

The "<BREAK>AT<CR>" sequence is called an OUT-OF-BAND sequence because a break signal cannot be sent as part of a data file. Instead it is sent by a direct program command to the UART being used by that computer. The <BREAK>AT<CR> escape sequence usually operates as a temporary escape to COMMAND mode with an automatic return to ON-LINE mode. If desired, it can also be used as a wait for command to return to ON-LINE mode escape sequence. In either case, you can still send breaks without causing an escape to COMMAND mode. For specifics, see the explanation of "<BREAK>AT" operation. Note that the use of "<CR>" as the activation character is also a defacto industry standard; a different character can be selected using the modems S3 register. The modem manuals for many industry modems contain a listing of the character code values and entry procedures for S3 register. For the remainder of this section "<CR>" will be used, with the understanding that they could be changed to other characters, for example "@" and "$".

Prior to describing the "<BREAK>AT<CR>" method, BREAK must be defined. BREAK is defined in two ways, either as the transmission of binary 0 for a minimum of 10 bits, or as a minimum time interval of 135 ms. as established in the CCITT X.28 standard. Note that this minimum time interval is greater than 10 bit times for any given serial rate, which ensures that conflicts do not occur. Additionally, most modern day UARTs usually have a bit to control the sending of BREAK and also control the duration of the BREAK interval by a couple of different methods.

If the UART permits, load dummy characters into the UART's send buffer. This allows the length of the BREAK interval to be established in character intervals, with the duration varying with the serial speed being used. Or a general timer may be set up establishing a fixed length for the BREAK interval, as in CCITT X.28. To be sure of the method to use, refer to the UART's specifications. In higher level languages and on various computers, routines or keys are already setup to send BREAK for fixed intervals.

The <BREAK>AT<CR> escape method usually operates as a temporary escape to COMMAND mode with an automatic return to ON-LINE mode, unless the modem is told to hang up. Note that if it is desireable to use "<BREAK>AT<CR>" as a wait for command to return to ON-LINE mode escape sequence, then after the BREAK send the command "AT+++<CR>". This keeps the modem in COMMAND mode until an "ATO<CR>" is issued.

The <BREAK>AT<CR> escape method is defined as follows. When the modem detects the BREAK signal, it blocks the BREAK, the following "AT" and any command characters from being passed to the other side. The modem then waits for a <CR> instructing it to escape to COMMAND mode. After which, it executes the command(s) and then returns to ON-LINE mode.

The BREAK and any characters are passed to the other side and the escape is aborted if any of the following occurs. An illegal sequence is detected. An illegal sequence occurs when either a character other than "A" follows the <BREAK>, or a character other than "T" follows "<BREAK>A" or two BREAKS are received in succession, at which point the modem will send one BREAK to the other side, clear the command buffer and abort the escape sequence.

An illegal sequence also occurs when a <CR> does not occur in the period time (in seconds) determined by the value of the wait for <CR> time, or BREAK passthru register S32, which controls the passthru of BREAK or a <CR> does not occur within the number of characters equal to the modems standard command buffer length, which in this case is sixty characters, the value of the maximum number of characters before <CR> (S34) is ignored.

In operation, once the modem has received the BREAK, the S32 wait for <CR> time or BREAK passthru interval is started. The S32 value determines how much time can elapse, before the entire "AT . . . <CR>" sequence must be completed. Receiving a <CR> within the time interval allows the modem to escape to COMMAND mode, execute the command(s) and return to ON-LINE mode. If a <CR> is not received prior to the time interval elapsing or an illegal sequence detected, then the BREAK and any characters are passed on, the command buffer is cleared and the escape aborted. If two BREAKS are received in succession, then the modem will send one BREAK to the other side, clear the command buffer and abort the escape sequence.

S-Registers that modify the <BREAK>AT<CR> escape sequence

S32 register is defined as follows. Register S32 wait for <CR> time or BREAK passthru establishes a time interval that determines how much time can elapse between the receipt of a "<BREAK>AT" and when a <CR> must occur after which the BREAK and any characters are passed to the other side. The default S32 value is 20, which equals 2 seconds.

In operation, if a user is ON-LINE and wants to set S0 register to answer on the first ring, the following sequence of events occurs enabling the modem to escape to COMMAND mode. First send the command to set S0 and then return back to ON-LINE mode.

1. The <BREAK> signal is sent to the modem.
2. The modem buffers <BREAK>.
3. The modem starts the S32 wait for <CR> timer.
4. "ATS0=1<CR>" is sent to the modem.
5. The modem buffers "ATS0=1<CR>" and identifies it as a valid command.
6. The modem escapes to COMMAND mode.
7. The modem executes the command, setting S0=1.
8. The modem returns to ON-LINE mode.

To hang up the modem, the user would, after the BREAK, send the command "ATH0<CR>" causing the modem to hang up and stay in COMMAND mode. If the user wanted to use "<BREAK>AT<CR>" as a wait for command to return to ON-LINE mode escape sequence, then after the BREAK the command "AT+++<CR>" would be sent. Keeping the modem in COMMAND mode until an "ATO<CR>" is issued.

The value of S34 is ignored and the modems standard command length buffer is used.

What is claimed is:

1. A method of controlling a modem connected to a personal computer, comprising the steps of:

sending a <BREAK> signal to a modem;

buffering the <BREAK> signal in the modem;

starting a timer to wait for a <CR>;

sending "ATS0=1<CR>" to the modem;

buffering "ATS0=1<CR>" at the modem;

identifying "ATS0=1<CR>" as a valid command at the modem;

causing the modem to escape to COMMAND mode;

executing the command "ATS0=1<CR>"; and returning the modem to ON-LINE mode.

* * * * *